United States Patent
Caldwell

(10) Patent No.: US 7,615,979 B2
(45) Date of Patent: Nov. 10, 2009

(54) FLEXIBLE POWER CONVERTER AND SIMPLIFIED PROCESS CONTROLLER

(75) Inventor: David John Caldwell, Carlsbad, CA (US)

(73) Assignee: David J. Caldwell, Carlsbad, CA (US)

( * ) Notice: Subject to any disclaimer, the term of this patent is extended or adjusted under 35 U.S.C. 154(b) by 312 days.

(21) Appl. No.: 11/604,528

(22) Filed: Nov. 27, 2006

(65) Prior Publication Data

US 2007/0120543 A1    May 31, 2007

Related U.S. Application Data

(60) Provisional application No. 60/740,557, filed on Nov. 28, 2005.

(51) Int. Cl.
*G05F 1/56* (2006.01)

(52) U.S. Cl. .................. 323/283; 323/222; 323/267; 363/98

(58) Field of Classification Search .......... 323/222, 323/267, 271, 272, 283; 363/98, 132
See application file for complete search history.

(56) References Cited

U.S. PATENT DOCUMENTS

| | | | | |
|---|---|---|---|---|
| 4,347,474 A * | 8/1982 | Brooks et al. | ............... | 323/224 |
| 5,307,004 A * | 4/1994 | Carsten | ............... | 323/222 |
| 6,037,755 A * | 3/2000 | Mao et al. | ............... | 323/222 |
| 6,166,527 A * | 12/2000 | Dwelley et al. | ............... | 323/222 |
| 6,348,781 B1 * | 2/2002 | Midya et al. | ............... | 323/224 |
| 6,593,724 B1 * | 7/2003 | Chen | ............... | 323/283 |
| 6,600,300 B2 * | 7/2003 | Groeneveld et al. | ............... | 323/282 |
| 6,771,052 B2 * | 8/2004 | Ostojic | ............... | 323/266 |
| 6,924,630 B1 * | 8/2005 | Pacala | ............... | 323/224 |
| 7,202,641 B2 * | 4/2007 | Claessens et al. | ............... | 323/222 |
| 7,230,405 B2 * | 6/2007 | Jang et al. | ............... | 323/222 |
| 7,242,168 B2 * | 7/2007 | Muller et al. | ............... | 323/222 |
| 7,256,568 B2 * | 8/2007 | Lam et al. | ............... | 323/222 |
| 7,325,749 B1 * | 2/2008 | Alexander et al. | ............... | 236/78 A |

OTHER PUBLICATIONS

David J. Caldwell, "Flexible Power Amplifier Doubles As Process Controller", Electronic Design Magazine, Nov. 29, 2004, pp. 70472, Penton Publication, USA.

* cited by examiner

*Primary Examiner*—Jeffrey L Sterrett

(57) ABSTRACT

Flexible power converter and simplified process controller capable of being configured for a variety of applications with minimal effort. The power converter has a plurality of power switches that can be configured for multiple topologies through selectable routing of switch commands. The process controller can be adjusted through a single timing parameter to process the configured feedback signal. External settings or serial port configuration enable stand-alone or processor-based operation. The invention may be quickly and easily applied as a versatile power supply, motor driver, thermal regulator, or controller for lighting and flow applications. The flexible power converter and simplified process controller reduces development time and cost, reduces parts count and cost, and improves performance and reliability of power and control systems.

17 Claims, 6 Drawing Sheets

Preferred Embodiment of Invention

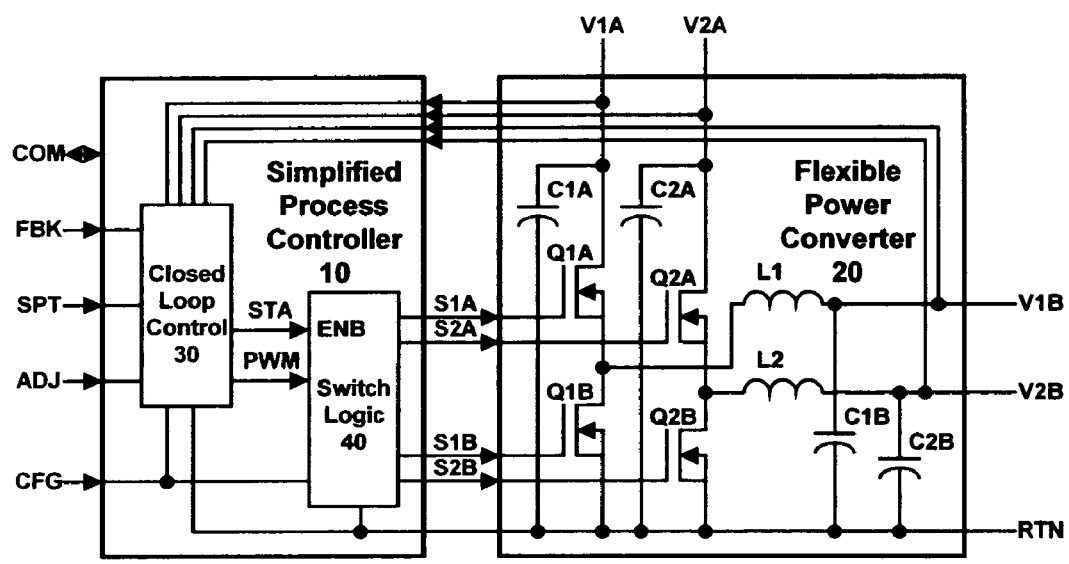
Figure 1. Preferred Embodiment of Invention

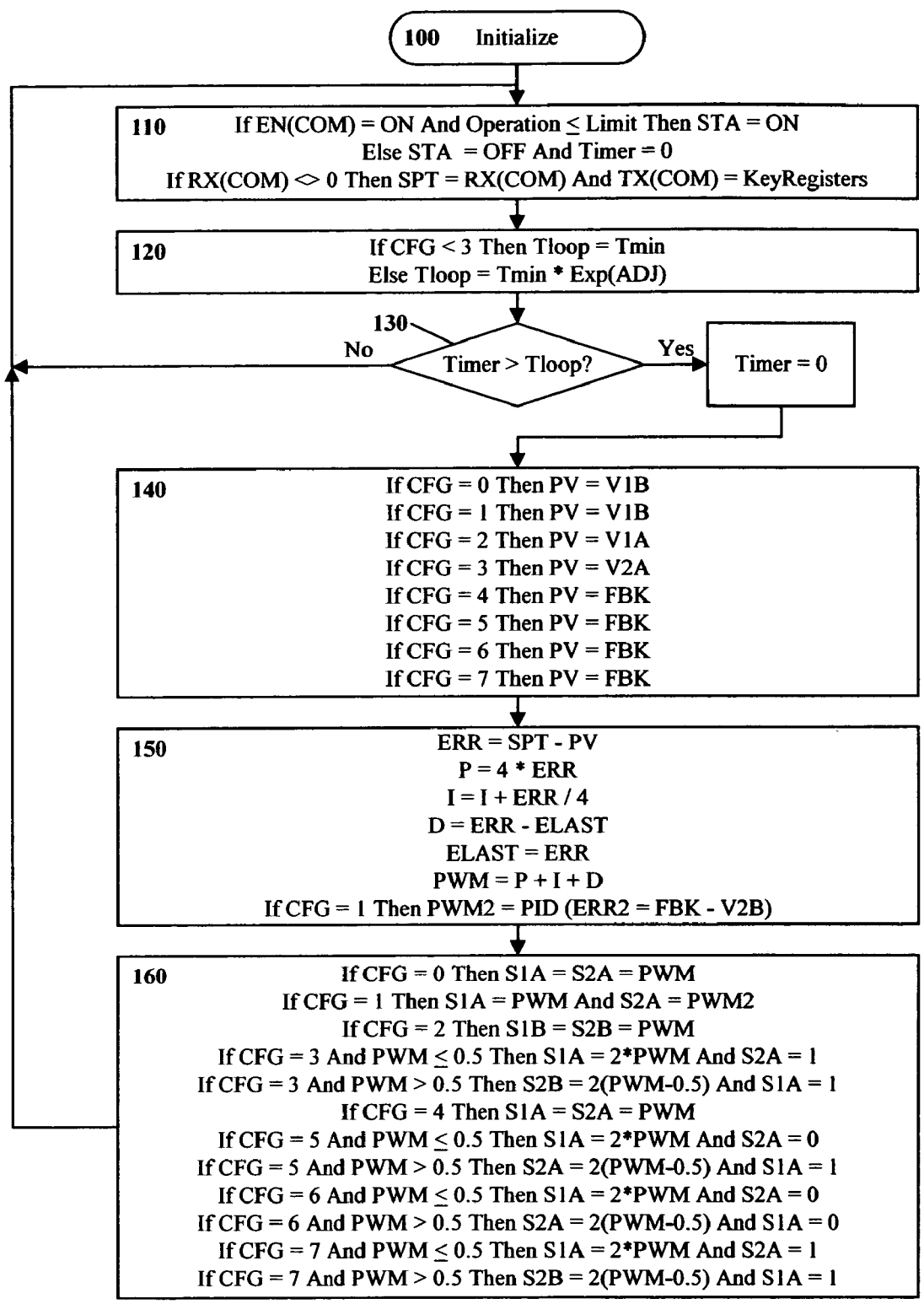
Figure 2. Invention Operational Flow Chart

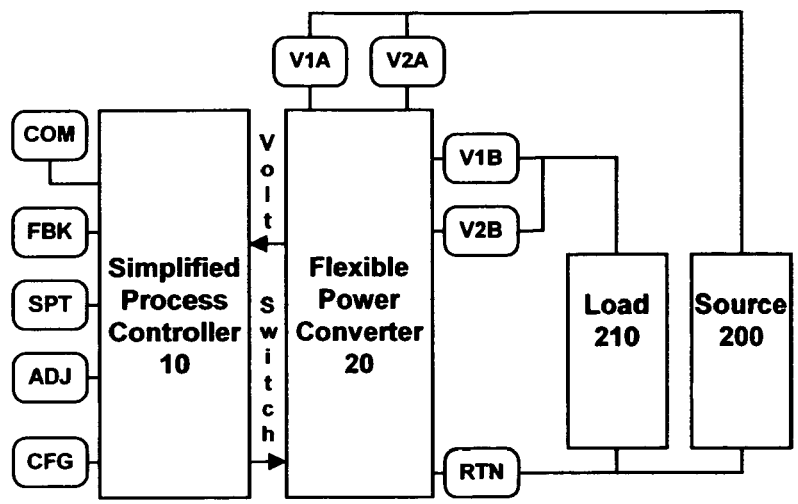
Figure 3A. Application CFG=0: Parallel Buck Converter
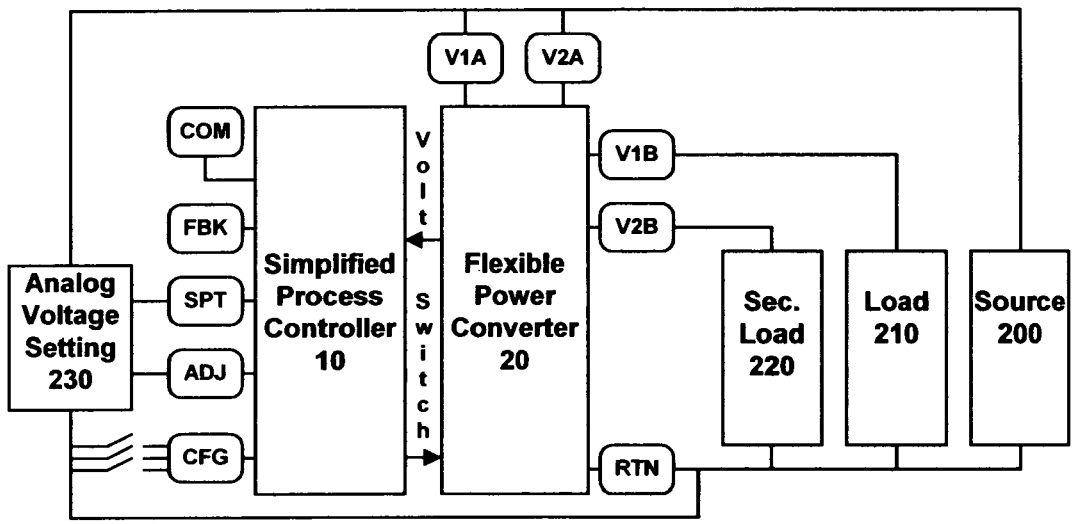
Figure 3B. Application CFG=1: Dual Independent Buck Converter

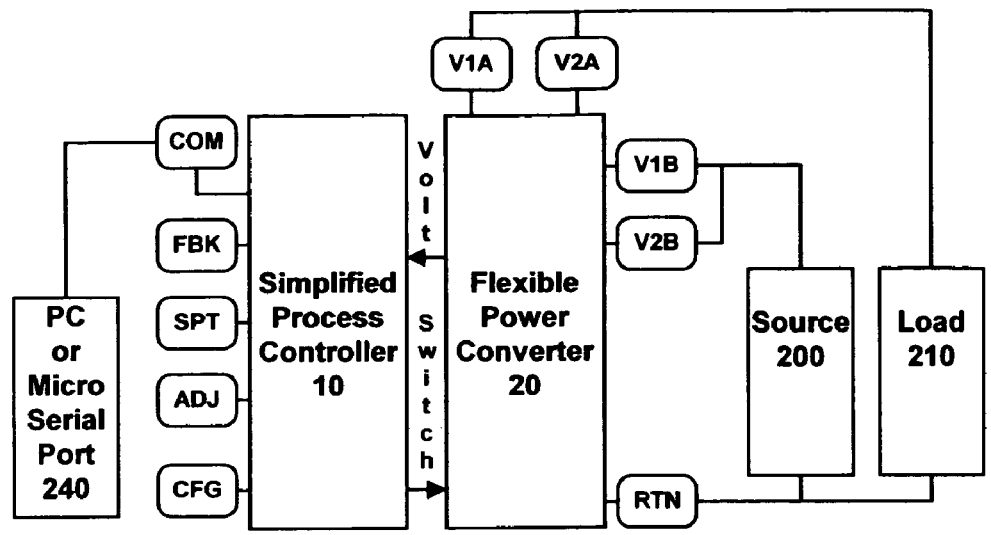
Figure 3C. Application CFG=2: Parallel Boost Converter
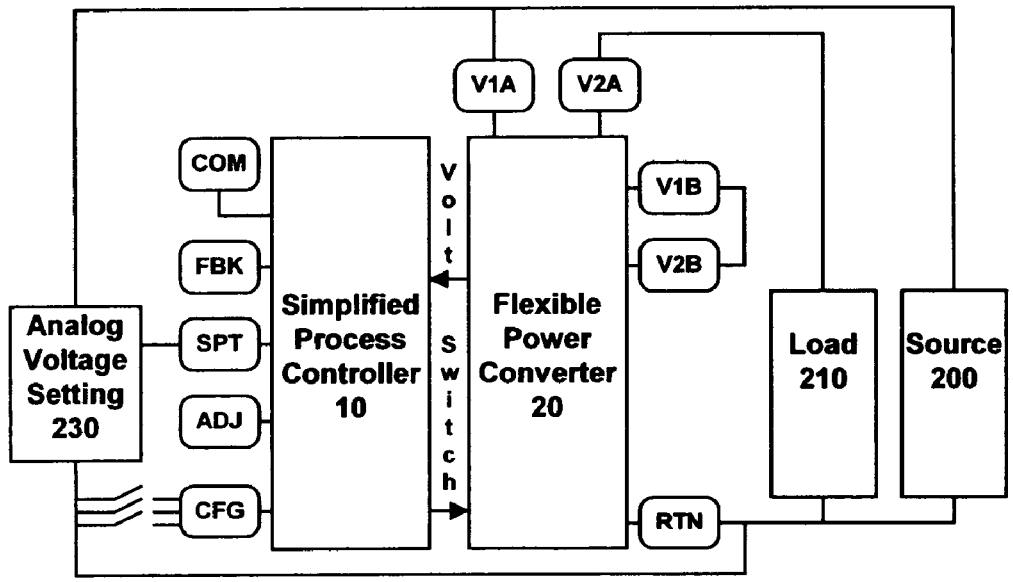
Figure 3D. Application CFG=3: Buck-Boost Converter

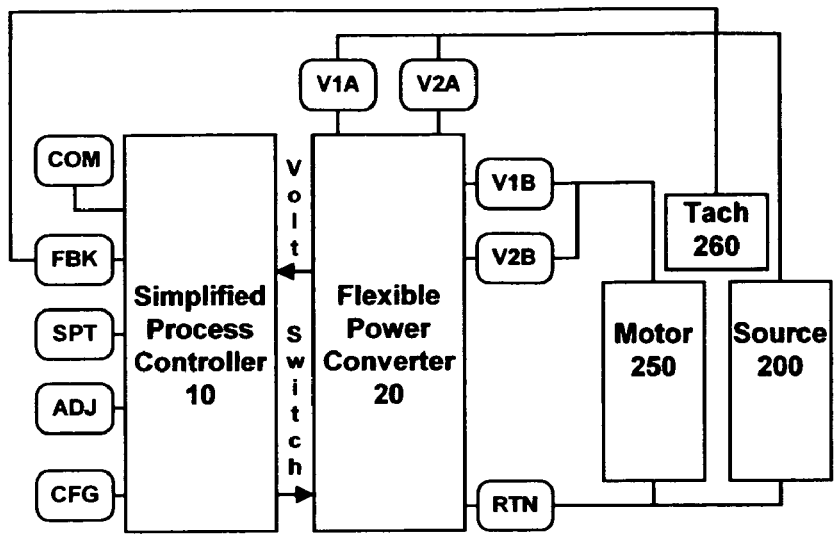
Figure 3E. Application CFG=4: High-Power Motor Speed Controller
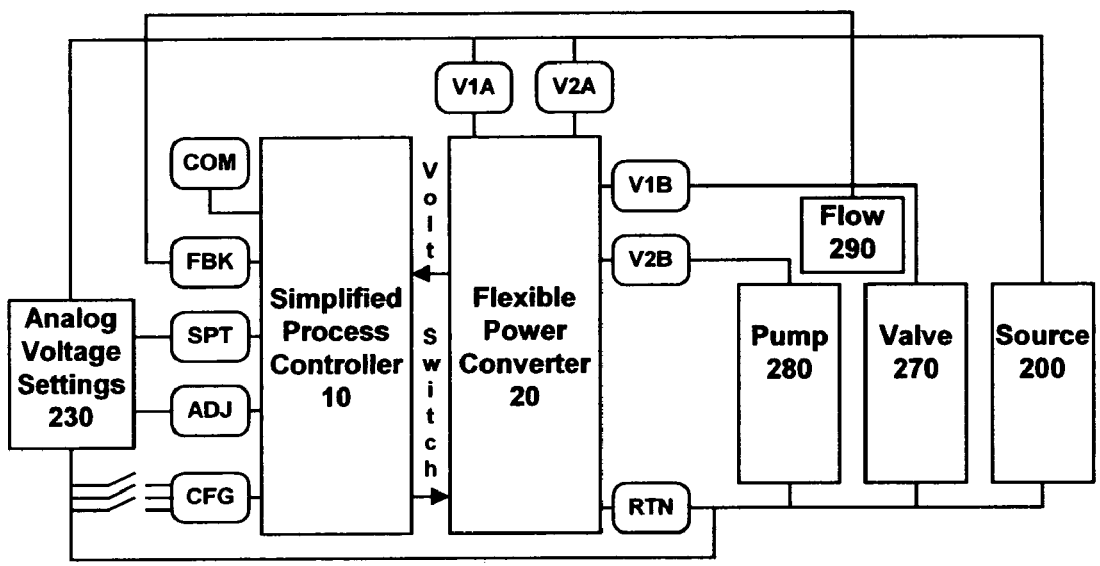
Figure 3F. Application CFG=5: Sequential Flow Controller

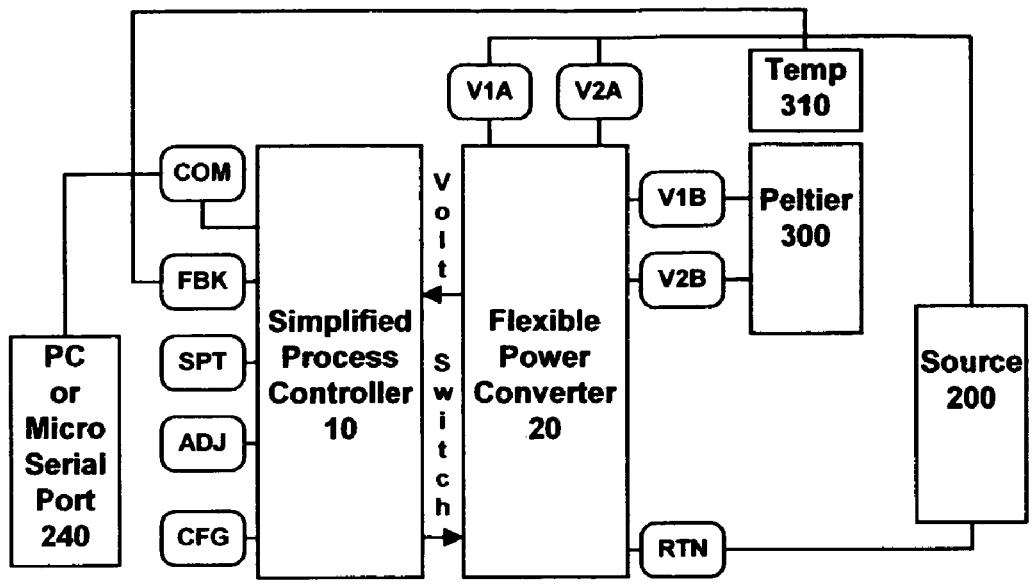
Figure 3G. Application CFG=6: Bi-directional Thermal Controller
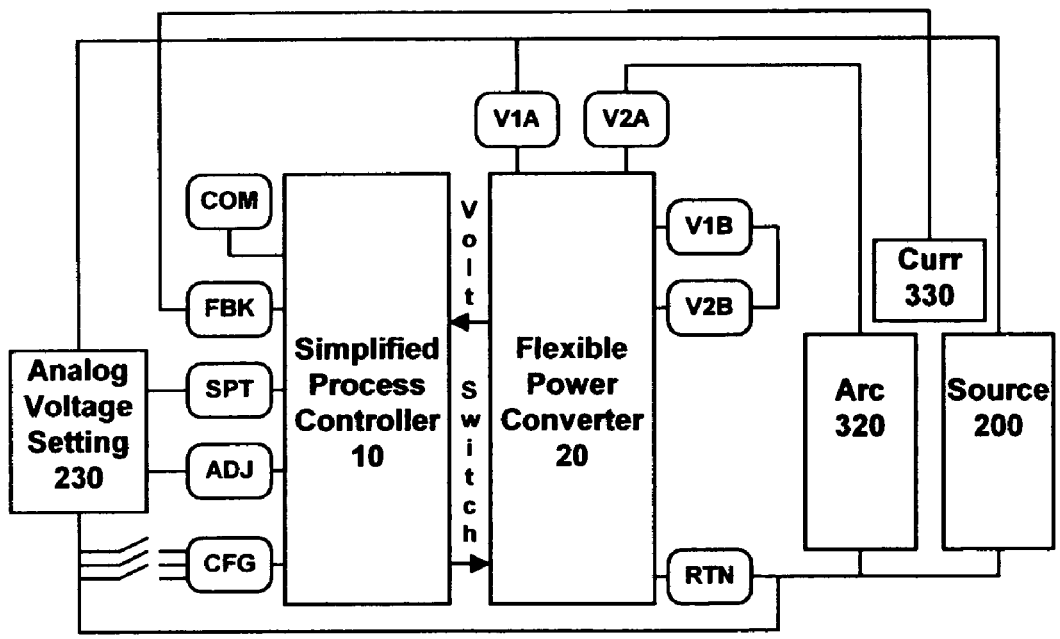
Figure 3H. Application CFG=7: Wide-Range Arc Controller

FLEXIBLE POWER CONVERTER AND SIMPLIFIED PROCESS CONTROLLER

CROSS-REFERENCE TO RELATED APPLICATIONS

This application is entitled to the benefit of Provisional Patent Application Ser. No. 60/740,557 filed Nov. 28, 2005.

BACKGROUND

1. Field of Invention

This invention is an electronic apparatus for power conversion and process control.

2. Description of Prior Art

Virtually every electrical system, whether the application is energy, electronic, motion, thermal, lighting, or flow, has a power converter to maintain constant voltage. Most of these systems also have an independent process controller that then changes that voltage to maintain constant charge, current, velocity, temperature, intensity, or pressure. Electrical energy is lost as voltage is first conditioned by the power converter then reconditioned by the process controller. Human energy is lost as the power converter and process controller are uniquely developed for each application. Money is also lost in the design and production of a separate power converter and process controller.

U.S. Pat. No. 6,031,749 by Covington discloses a Universal Power Module. It contains a high number of components yet is only suitable for lighting applications. Single control timing adjustment is not disclosed for simplified process control. Output filters are not disclosed for flexible power conversion.

U.S. Pat. No. 6,005,377 by Chen discloses a Programmable Digital Controller for Switch Mode Power Conversion and Power Supply Employing the Same. It contains a high number of components yet is only suitable for power supply applications. External system process feedback and single control timing adjustment options are not disclosed for simplified process control. Multiple power stage configurations are not disclosed for flexible power conversion U.S. Pat. No. 4,972,130 by Rossi discloses a Multipurpose, Internally Configurable Integrated Circuit for Driving in a Switching Mode External Inductive Loads According to a Selectable Connection Scheme. It contains a high number of components yet is only suitable for motor applications. Single control timing adjustment is not disclosed for simplified process control. Output filters are not disclosed for flexible power conversion.

U.S. Pat. No. 5,307,004 by Carsten discloses Soft Switching Boost and Buck Regulators. External system process feedback and single control timing adjustment options are not disclosed for simplified process control. Only voltage regulation is implied while no closed loop controller is explicitly disclosed. Users are left to custom design a unique controller for each application.

U.S. Pat. No. 6,593,724 by Chen discloses Polyphase PWM Converter with High Efficiency at Light Loads. Only voltage regulation is disclosed. External process feedback and single control timing adjustment options are not disclosed for simplified process control. Only the buck converter topology is disclosed. Multiple power stage configurations are not disclosed for flexible power conversion In contrast to these limited application devices, the invention disclosed here may be quickly and easily applied as a versatile power supply, motor driver, thermal regulator, or controller for lighting and flow applications. The flexible power converter and simplified process controller reduces development time and cost, reduces parts count and cost, and improves performance and reliability of power and control systems.

SUMMARY

This invention is a flexible power converter and simplified process controller that may be quickly and easily configured for a broad range of applications.

Objects and Advantages

This invention takes advantage of the fact that most power converter and process control applications contain the same basic elements, whose configuration is application dependent. By combining configurable power and control elements with a simple configuration interface, a power converter and process controller is achieved that may be quickly and easily configured for a broad range of applications. Accordingly, several objects and advantages of this invention are:

a) reduced development time since the user only needs to select configuration settings for the power converter and process controller, rather than design the power converter and process controller architecture;

b) reduced development cost since extensive expertise or specialized equipment is not required to configure the power converter and process controller, as built-in selections automate the process;

c) reduced parts count since a single controller contains all the elements required for both power conversion and process control;

d) reduced parts cost since the power converter and process controller can be manufactured in mass volume for a large number of markets and applications;

e) improved performance since the invention is developed specifically for power conversion and process control;

f) improved reliability since the same converter and controller is tested in a variety of applications by a variety of users.

Further objects and advantages of this invention will become apparent from a consideration of the drawings and ensuing description.

DRAWING FIGURES

FIG. 1 shows preferred embodiment of invention.

FIG. 2 shows invention operational flow chart.

FIG. 3A shows application for configuration zero: Parallel Buck Converter:

FIG. 3B shows application for configuration one: Dual Independent Buck Converter.

FIG. 3C shows application for configuration two: Parallel Boost Converter.

FIG. 3D shows application for configuration three: Buck-Boost Converter.

FIG. 3E shows application for configuration four: High-Power Motor Speed Controller.

FIG. 3F shows application for configuration five: Sequential Flow Controller.

FIG. 3G shows application for configuration six: Bi-directional Thermal Controller.

FIG. 3H shows application for configuration seven: Wide-Range Arc Controller.

DESCRIPTION—PREFERRED EMBODIMENT

FIG. 1 is a preferred embodiment of the invention. Flexible Power Converter 20 and Simplified Process Controller 10 are capable of being configured for a variety of applications with minimal effort. Power Converter 20 has dual filtered half-bridges that can be configured for multiple topologies. Process Controller 10 can be adjusted through a single timing parameter to process the configured feedback signal. External settings or serial port configuration enable stand-alone or processor-based operation. The invention may be quickly applied as a versatile power supply, motor driver, thermal regulator, or controller for lighting and flow applications.

Power Converter

Flexible Power Converter 20 has dual filtered half-bridges. Complementary switches Q1A and Q1B comprise the first half-bridge commanded by Pulse Width Modulated (PWM) signals S1A and S1B. Inductor L1 with capacitors C1A and C1B filter high frequency switching. Voltage V1B is approximately equal to V1A scaled by PWM duty cycle. The second half bridge comprising complementary switches Q2A and Q2B is commanded by PWM signals S2A and S2B. Voltage relationship between V2A and V2B is same as the first half-bridge.

Synchronous rectification is versatile because current flow is bidirectional. The buck (step-down) converter in FIG. 3A is changed to the boost (step-up) converter in FIG. 3C by exchanging the source and load, processing V1A feedback rather than V1B, and inverting the PWM signals. The second half-bridge enables parallel, independent, full-bridge, sequential, or buck-boost operation to satisfy multiple applications dependent on configuration of Controller 10.

Process Controller

Process Controller 10 commands Power Converter 20 switches to drive the configured feedback FBK, V1A, V1B, V2A, or V2B toward setpoint SPT. Closed Loop Control 30 and Switch Logic 40 are configured by CFG for a specific application. Communication COM has Enable input and Status output, with optional serial port for monitoring and commanding.

Closed Loop Control 30 modifies PWM command based on the difference between feedback and setpoint SPT. Feedback can be V1A, V1B, V2A or V2B in voltage mode or external signal FBK in process mode, dependent on configuration CFG. Adjustment ADJ extends the closed loop update interval in process mode.

Switch Logic 40 routes the PWM command to the appropriate Power Converter 20 switches S1A, S1B, S2A, and S2B dependent on configuration CFG to enable multiple converter topologies. Status STA turns off all Power Converter 20 switches if Process Controller 10 is disabled or detects a fault.

Operational Flow

Operational flow of the invention is charted in FIG. 2. Process 100 initializes key registers. Processes 110, 120 and 130 perform status STA, communication COM, and update interval adjustment ADJ. Processes 140, 150, and 160 select feedback, perform closed loop control, and route PWM commands.

Process 110 performs communication COM to read Enable input and write Status output. Power Converter 20 is disabled if operation is outside of allowed range. Optional serial port allows setpoint SPT to be written and key registers to be read.

Process 120 selects minimum update interval for voltage mode, or extends update interval for process mode, dependent on configuration CFG. Update interval is extended exponentially as a function of adjustment ADJ to cover wide range of application time constants. Process 130 executes closed loop update at desired interval and resets timer.

Process 140 selects feedback process variable dependent on configuration CFG. Process 150 performs closed loop control calculation. Proportional, Integral, and Differential (PID) algorithm is applied with gains empirically found to control a variety of typical applications. The PWM command is set to the PID result. A second PID calculation is required if dual independent outputs are both processed.

Process 160 routes PWM command to appropriate switches dependent on configuration CFG. Switch Q1A is set to PWM in buck mode or Q1B in boost mode. Different switching schemes are used above and below 0.5 duty (50%) PWM for buck-boost, sequential, and full-bridge modes.

EXAMPLE APPLICATIONS

Eight example applications are illustrated in FIG. 3 based on invention in FIG. 1 following operational flow in FIG. 2. Various power converter topologies, process control cases, and user interfaces are shown.

FIG. 3A is example application for CFG=0. Parallel buck converter for high output current with settings and configuration preprogrammed through serial port.

FIG. 3B is example application for CFG=1. Dual independent buck converter with analog setting (DAC, reference, resistor, potentiometer, op-amp, sensor, etc.) and configuration by switches.

FIG. 3C is example application for CFG=2. Parallel boost converter with user interactive serial setting and configuration.

FIG. 3D is example application for CFG=3. Buck-boost converter with analog setting (DAC, reference, resistor, potentiometer, op-amp, sensor, etc.) and configuration by switches.

FIG. 3E is example application for CFG=4. High-power motor speed controller with settings and configuration preprogrammed through serial port.

FIG. 3F is example application for CFG=5. Sequential flow controller with analog setting (DAC, reference, resistor, potentiometer, op-amp, sensor, etc.) and configuration by switches.

FIG. 3G is example application for CFG=6. Bi-directional thermal controller with interactive serial setting and configuration.

FIG. 3H is example application for CFG=7. Wide range arc controller with analog setting (DAC, reference, resistor, potentiometer, op-amp, sensor, etc.) and configuration by switches.

Conclusion, Ramifications, and Scope

The disclosed invention is a flexible power converter and process controller that may be quickly and easily configured for a broad range of applications. This invention reduces development time and cost, reduces parts count and cost, and improves performance and reliability of power and control systems.

Countless applications exist past the eight examples cited. For example, other control methods such as fully adjustable PID), adaptive, or custom algorithms are variations of the invention. A third half-bridge could be added to enable operation of three-phase motors and generators, or provide an auxiliary output. Negative voltage could be generated at one output with an isolated ground at other output. Digital feedback such as encoder, PWM, serial data could be adopted. The device could be implemented in dedicated hardware for maximum speed or firmware for maximum customization.

Additional features commonly found in power converters or process controllers include phase delayed switching of each half-bridge to reduce voltage and current ripple, sensorless current detection based on relationship between voltages and duty cycle, or configurable start-up delay and ramp-up. It is also obvious to apply multiple units with synchronized clock for parallel outputs, or switch in pulse mode rather than PWM at low power to reduce switch loss.

Although the invention has been described in terms of a preferred embodiment, it will be obvious to those skilled in the art that alterations and modifications may be made without departing from the invention. Accordingly, it is intended that all such alterations and modifications be included within the spirit and scope of the invention as defined by the appended claims.

I claim:

1. A power converter and process controller with a configuration setting input, comprising:
    a) a closed loop control element of said process controller with a configurable feedback input dependent on said configuration setting selectable from said power converter signals and an external signal, a timing adjustment input to adjust control calculations for time constant of said configurable feedback, a switch command output with value dependent on said control calculations to drive value of said configurable feedback toward value of a setpoint input,
    b) a configurable switch logic element to route said switch command from said closed loop control element to a plurality of power switches dependent on said configuration setting to select topology of said power converter,
    c) a plurality of said power switches of said power converter arranged to vary load voltage dependent on value and routing of said switch command,
    whereby, said power converter and process controller is configurable for a multitude of applications.

2. The power converter and process controller of claim 1 wherein said timing adjustment is adjusted through a single parameter, whereby process control is simplified.

3. The power converter and process controller of claim 1 wherein said configuration setting is configurable by static voltage values and is configurable by serial port, whereby stand-alone or processor-based operation may be selected.

4. The power converter and process controller of claim 1 wherein said switch logic element is configurable for at least two different routings of said switch command to said power switches selected from the group consisting of parallel switching and independent switching and sequential switching and buck switching and boost switching and buck-boost switching and full-bridge switching and three-phase switching, whereby power conversion is flexible.

5. The power converter and process controller of claim 1 wherein said configuration setting is configured by static voltage values, whereby standalone operation is achieved without computer interface.

6. The power converter and process controller of claim 1 wherein said closed loop control element and said switch logic are configurable for at least two applications selected from the group consisting of voltage regulation and motion control and thermal control and lighting control and flow control.

7. The power converter and process controller of claim 1 wherein said power switches of said power converter are connected and coupled through capacitors and inductors arranged as a plurality of filtered half-bridges.

8. A method of power conversion and process control configured by a configuration setting input, comprising:
    a) providing a closed loop control element of said process control method with a configurable feedback input selectable from said power conversion signals and an external signal, a timing adjustment input to adjust control calculations for time constant of said configurable feedback, and a switch command output that drives said configurable feedback value toward a setpoint input value,
    b) providing a configurable switch logic element that routes switch command from said closed loop control element to a plurality of power switches dependent on said configuration setting to select topology of said power conversion method,
    c) providing a plurality of said power switches of said power conversion method arranged to vary load voltage dependent on value and routing of said switch command,
    whereby, said power conversion and process control method is configurable for a multitude of applications.

9. The method of power conversion and process control in claim 8 wherein said configuration setting is configurable by static voltage values and is configurable by serial port settings, whereby stand-alone or processor-based operation may be selected.

10. The method of power conversion and process control in claim 8 wherein said timing adjustment is adjusted through a single parameter, whereby process control is simplified.

11. The method of power conversion and process control in claim 8 wherein said power switches of said power conversion method are connected and coupled through capacitors and inductors arranged as a plurality of filtered half-bridges.

12. The method of power conversion and process control in claim 8 wherein said switch logic element is configurable for at least two different routings of switch command to said power switches selected from the group consisting of parallel switching and independent switching and sequential switching and buck switching and boost switching and buck-boost switching and full-bridge switching and three-phase switching, whereby power conversion is flexible.

13. The method of power conversion and process control in claim 8 wherein said closed loop control element and said switch logic element are configured by static voltage values, whereby standalone operation is achieved without computer interface.

14. A power converter configurable for a plurality of topologies and a process controller to adjust said power converter output to drive value of a feedback input toward value of a setpoint input dependent on control calculations adjusted by a single timing input for the time constant of said feedback input.

15. The power converter and process controller of claim 14 wherein said power converter is comprised of power switches connected and coupled through capacitors and inductors arranged as a plurality of filtered half-bridges.

16. The power converter and process controller of claim 14 wherein said timing input is configured by at least one static voltage value.

17. The power converter and process controller of claim 14 wherein topology of said power switches is configured by at least one static voltage value.

* * * * *